UNITED STATES PATENT OFFICE.

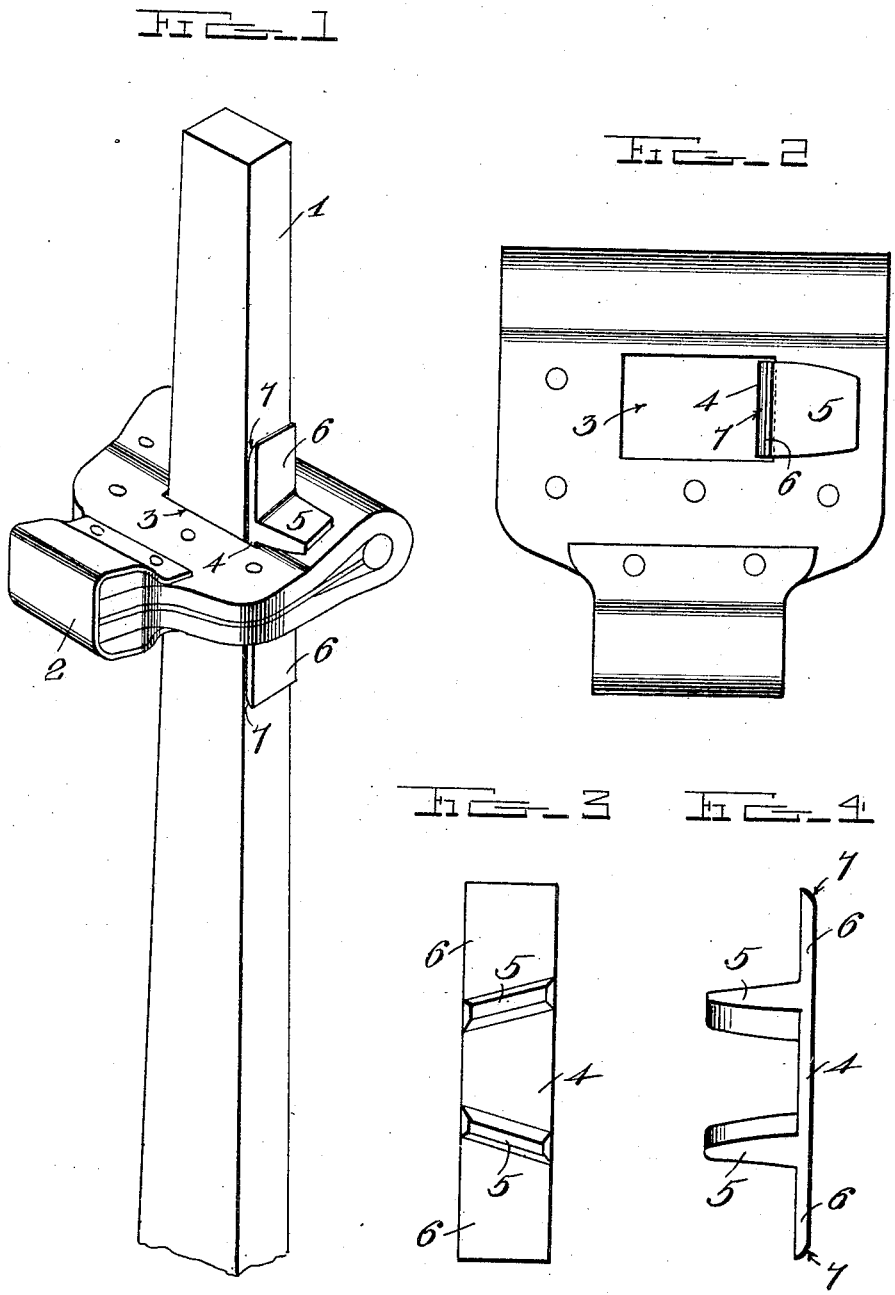

OSIAS POITRAS, OF FITCHBURG, MASSACHUSETTS.

PICKER FOR LOOMS.

No. 909,333.          Specification of Letters Patent.          Patented Jan. 12, 1909.

Application filed June 25, 1908. Serial No. 440,254.

*To all whom it may concern:*

Be it known that I, OSIAS POITRAS, a subject of the King of Great Britain, residing at Fitchburg, in the county of Worcester and State of Massachusetts, have invented certain new and useful Improvements in Pickers for Looms; and I do declare the following to be a full, clear, and exact description of the invention, such as will enable others skilled in the art to which it appertains to make and use the same.

My invention relates to pickers for looms. Many types of these pickers have been used, but principally the pear - shaped picker. Most of these pickers are made of deeply oiled rawhide and have a comparatively long life for the work and strain to which they are subjected. They, however, wear the picker stick considerably and become very loose thereon so that their operation is sometimes uncertain. Frequently entire fabrics have been ruined owing to the breaking of the picker stick, which has been caused by the wearing of the picker from constant rubbing thereon, and it is the object of my invention to obviate and avoid these difficulties so that the picker stick and picker will have a considerably longer life than they have heretofore had.

With these and other objects in view, the invention consists of certain novel features of construction, combination and arrangement of parts, as will be more fully described and particularly pointed out in the appended claims.

In the accompanying drawings, Figure 1 is a perspective view of the picker mounted on the end of a picker stick, Fig. 2 is a top plan view with the picker removed from the stick, Fig. 3 is a front elevation of the attachment removed from the picker, and Fig. 4 is a side elevation thereof.

Referring more especially to the drawings, 1 represents a picker stick of the usual form and 2 the pear-shaped picker having the usual aperture 3 for the passage of the stick 1.

The attachment for the picker comprises a flat body portion 4, from which projects the lugs 5 in a transverse direction to the body and the extensions 6. The extensions 6 are curved at their outer ends as shown at 7, and the lugs 5 are flared from their inner to their outer edges so as to properly receive the enlarged end of the picker. This attachment or wear plate is so constructed that the picker may be reversed upon the stick, as is usual.

It will thus be seen that I have provided an attachment for pickers which will prolong their life, and which will at the same time prevent wear upon the picker stick and the consequent breaking thereof to the detriment of the loom.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

Having thus described my invention, what I claim and desire to secure by Letters Patent is:—

1. A wear plate for loom pickers having means to loosely hold the plate upon the picker, and means extending beyond the picker on either side to protect the picker stick.

2. A wearing attachment for loom pickers comprising a pair of lugs arranged on either side of the pickers adapted to hold the attachment to the picker, and an elongated shoe integral with the lugs and extending beyond the picker on either side thereof.

3. A wear plate for loom pickers having means integral with the plate to loosely hold the same upon the picker and wear shoes extending beyond the means on either side of the picker to protect the picker stick.

In testimony whereof I have hereunto set my hand in presence of two subscribing witnesses.

OSIAS POITRAS.

Witnesses:
 EMILE ROBILLARD,
 EDWARD F. LECLAIR.